(12) United States Patent
Bello et al.

(10) Patent No.: US 9,396,138 B2
(45) Date of Patent: *Jul. 19, 2016

(54) PARALLEL BLOCK ALLOCATION FOR DECLUSTERED LOGICAL DISKS

(71) Applicant: International Business Machines Corporation, Armonk, NY (US)

(72) Inventors: Adekunle Bello, Pflugerville, TX (US); Aruna Yedavilli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 30 days.

This patent is subject to a terminal disclaimer.

(21) Appl. No.: 14/810,953

(22) Filed: Jul. 28, 2015

(65) Prior Publication Data
US 2015/0347321 A1 Dec. 3, 2015

Related U.S. Application Data

(63) Continuation of application No. 14/730,368, filed on Jun. 4, 2015, which is a continuation of application No. 14/468,666, filed on Aug. 26, 2014, now Pat. No. 9,134,927, which is a continuation of application No. 13/166,415, filed on Jun. 22, 2011, now Pat. No. 8,904,106.

(51) Int. Cl.
| | |
|---|---|
| *G06F 12/14* | (2006.01) |
| *G06F 3/06* | (2006.01) |
| *G06F 17/30* | (2006.01) |
| *G06F 12/02* | (2006.01) |

(52) U.S. Cl.
CPC ............ *G06F 12/1416* (2013.01); *G06F 3/061* (2013.01); *G06F 3/0619* (2013.01); *G06F 3/0622* (2013.01); *G06F 3/0631* (2013.01); *G06F 3/0643* (2013.01); *G06F 3/0644* (2013.01); *G06F 3/0665* (2013.01); *G06F 3/0671* (2013.01); *G06F 3/0673* (2013.01); *G06F 3/0689* (2013.01); *G06F 12/02* (2013.01); *G06F 17/30138* (2013.01); *G06F 2212/1044* (2013.01); *G06F 2212/1052* (2013.01)

(58) Field of Classification Search
None
See application file for complete search history.

(56) References Cited

U.S. PATENT DOCUMENTS

| | | | |
|---|---|---|---|
| 5,473,761 | A | 12/1995 | Parks et al. |
| 6,405,284 | B1 | 6/2002 | Bridge |

(Continued)

OTHER PUBLICATIONS

Massiglia, Paul; "The RAID book—A Storage System Technology Handbook 6th Edition"; Feb. 1997; pp. 151-161.

(Continued)

*Primary Examiner* — Christopher D Birkhimer
(74) *Attorney, Agent, or Firm* — Jason H. Sosa; Mark Vellone (57) ABSTRACT

In a method for allocating space on a logical disk, a computer receives an allocation request to allocate a number of requested logical disk extents. The computer selects one of a first group having an array of logical disk extents and a second group having an array of logical disk extents. The computer selects a group having a number of free logical disk extents that is greater than or equal to the number of requested logical disk extents. The logical disk extents in the array of the first group and in the array of the second group correspond to disk blocks on a logical disk. The logical disk spans one or more physical random access disks. The computer locks the selected group to prevent allocating a logical disk extent other than in response to the allocation request.

17 Claims, 5 Drawing Sheets

(56) References Cited

U.S. PATENT DOCUMENTS

| | | |
|---|---|---|
| 6,549,978 B2 | 4/2003 | Mansur et al. |
| 6,763,402 B2 | 7/2004 | Talati |
| 7,058,785 B1 | 6/2006 | Ochotta |
| 7,076,510 B2 | 7/2006 | Brown |
| 7,096,316 B1 | 8/2006 | Karr et al. |
| 7,200,715 B2 | 4/2007 | Kleiman et al. |
| 7,210,005 B2 | 4/2007 | Guha et al. |
| 7,246,369 B1 | 7/2007 | Duan et al. |
| 7,266,706 B2 | 9/2007 | Brown et al. |
| 7,328,307 B2 | 2/2008 | Hoogterp |
| 7,356,730 B2 | 4/2008 | Ulrich et al. |
| 7,366,856 B2 | 4/2008 | Leon et al. |
| 7,401,196 B2 | 7/2008 | Mori et al. |
| 7,444,420 B1 | 10/2008 | Mutalik et al. |
| 7,519,629 B2 | 4/2009 | Hafner et al. |
| 7,562,197 B2 | 7/2009 | Kano |
| 7,587,558 B1 | 9/2009 | Smith et al. |
| 7,620,766 B1 | 11/2009 | Waldspurger |
| 7,634,629 B2 | 12/2009 | Nemiroff et al. |
| 7,640,262 B1 | 12/2009 | Beaverson et al. |
| 7,647,443 B1 | 1/2010 | Chatterjee et al. |
| 7,730,258 B1 | 6/2010 | Smith et al. |
| 8,904,106 B2 | 12/2014 | Bello et al. |
| 2007/0079068 A1 | 4/2007 | Draggon |
| 2008/0313364 A1 | 12/2008 | Flynn et al. |
| 2009/0077333 A1 | 3/2009 | Byrne et al. |
| 2009/0083483 A1 | 3/2009 | Balakrishnan et al. |
| 2010/0115198 A1 | 5/2010 | Jess |
| 2010/0211755 A1 | 8/2010 | Han et al. |
| 2010/0306288 A1 | 12/2010 | Stein et al. |
| 2014/0365728 A1 | 12/2014 | Bello et al. |

OTHER PUBLICATIONS

Ripberger, Rick et al.; IBM Corporation; "IBM DS80000 Storage Allocation Overview, Including Thin Provisioning"; Version 1.0; Sep. 8, 2009.

Ripberger, Rick et al.; IBM Corporation; "IBM System Storage DS8000 Storage Virtualization Overview, Including Storage Pool Striping, Thin Provisioning , Easy Tier"; Version 2.0; Apr. 13, 2010.

Sanders et al.; "Fast Concurrent Access to Parallel Disks"; Proceedings of SODA 2000; Eleventh Annual ACM-SIAM Symposium on Discrete Algorithms; pp. 849-858; San Francisco, CA, USA; Jan. 9-11, 2000.

Sanders et al., "Fast Concurrent Access to Parallel Disks", Journal: Algorithmica, vol. 35, No. 1, pp. 21-55, Springer-Verlag, United States, Jan. 2003.

Zhang et al.; "Reposting Algorithms for Request Order Concurrency Control"; North Dakota State University; 2000.

JetStor; "RAID Level 10: Very High Reliability Combined with High Performance"; Printed Feb. 20, 2014; <web.archive.org/web/20110506151247/http://www.acnc.com/raidedu/10>.

U.S. Appl. No. 14/730,368 entitled "Parallel Block Allocation for Declustered Logical Disks", filed Jun. 4, 2015.

PARALLEL BLOCK ALLOCATION FOR DECLUSTERED LOGICAL DISKS

TECHNICAL FIELD

The present invention relates generally to a file system and more specifically to allocating disk blocks in a file system.

BACKGROUND

An application program stores and manipulates data in files and in directories via a file system. The file system allocates and de-allocates disk blocks in response to application program requests. Data stored in the files and directories are broken down into smaller segments of bytes and mapped to disk blocks. Thus disk blocks are allocated to store data according to service requests made by the application program. A block allocation map is used to keep track of the disk blocks as they are allocated so that the disk blocks may be retrieved by the application program. Thus, the algorithm used by a file system to allocate disk blocks affects how efficiently the file system stores and retrieves data and therefore, how efficiently the file system is able to service requests made by the application program.

File systems based on a sequential access storage layer, such as IBM's Journaled File System (JFS), realize significant performance benefits when accessing disk blocks that are physically, or logically, contiguous on a disk, despite the overhead required to maintain contiguous disk blocks. For example, because a sequential access file system must access disk blocks in a predetermined order, the file system could service a request for a group of disk blocks more efficiently if those disk blocks were physically, or logically, located next to each other in the file system. If the same group of disk blocks were dispersed throughout the disk in a noncontiguous manner, the file system would require more time to access the disk blocks since the storage media would need to do multiple seeks over the disk, at the storage layer, to read all of the disk blocks in the group.

File systems utilizing random disk access, however, do not realize much in performance gains by maintaining physically or logically contiguous disk blocks. To the contrary, maintaining contiguous disk blocks by the file system hinders performance if the underlying storage media is a random access device. Specifically, random access devices can access disk blocks consistently, regardless of the physical or logical location of disk blocks and regardless of the order in which disk blocks are accessed. In other words, the amount of time in which a random access device can access disk blocks does not change significantly if the disk blocks are not contiguous. Maintaining contiguous disk blocks, therefore, results in unnecessary overhead for the file system when allocating and de-allocating disk blocks for its files.

SUMMARY

In a first embodiment of the present invention, there is a method for allocating space on a logical disk. A computer receives an allocation request to allocate a number of requested logical disk extents. The computer selects one of a first group having an array of logical disk extents and a second group having an array of logical disk extents. The computer selects a group having a number of free logical disk extents that is greater than or equal to the number of requested logical disk extents. The logical disk extents in the array of the first group and in the array of the second group correspond to disk blocks on a logical disk. The logical disk spans one or more physical random access disks. The computer locks the selected group to prevent allocating a logical disk extent other than in response to the allocation request. The computer allocates the number of requested logical disk extents in the selected group, starting at a first index in the array of the selected group. The computer moves a first pointer from the first index in the array of the selected group to a second index in the array of the selected group, based at least in part on the number of requested logical disk extents. The computer releases the lock on the selected group to allow allocating a logical disk extent other than in response to the allocation request.

In a second embodiment of the present invention, there is a computer system for allocating space on a logical disk. The computer system has one or more processors, one or more computer-readable memories, one or more computer-readable tangible storage devices, and program instructions stored on at least one of the one or more storage devices for execution by at least one of the one or more processors via at least one of the one or more memories. The program instructions include program instructions to receive an allocation request to allocate a number of requested logical disk extents. The program instructions include program instructions to select one of a first group having an array of logical disk extents and a second group having an array of logical disk extents. The program instructions selected a group having a number of free logical disk extents that is greater than or equal to the number of requested logical disk extents. The logical disk extents in the array of the first group and in the array of the second group correspond to disk blocks on a logical disk. The logical disk spans one or more physical random access disks. The program instructions include program instructions to lock the selected group to prevent allocating a logical disk extent other than in response to the allocation request. The program instructions include program instructions to allocate the number of requested logical disk extents in the selected group, starting at a first index in the array of the selected group. The program instructions include program instructions to move a first pointer from the first index in the array of the selected group to a second index in the array of the selected group, based at least in part on the number of requested logical disk extents. The program instructions include program instructions to release the lock on the selected group to allow allocating a logical disk extent other than in response to the allocation request.

In a third embodiment of the present invention, there is a computer program product for allocating space on a logical disk. The computer program product has one or more computer-readable tangible storage devices and program instructions stored on at least one of the one or more storage devices. The program instructions include program instructions to receive an allocation request to allocate a number of requested logical disk extents. The program instructions include program instructions to select one of a first group having an array of logical disk extents and a second group having an array of logical disk extents. The program instructions selects a group having a number of free logical disk extents that is greater than or equal to the number of requested logical disk extents. The logical disk extents in the array of the first group and in the array of the second group correspond to disk blocks on a logical disk. The logical disk spans one or more physical random access disks. The program instructions include program instructions to lock the selected group to prevent allocating a logical disk extent other than in response to the allocation request. The program instructions include program instructions to allocate the number of requested logical disk extents in the selected group, starting at a first index in the array of the selected group. The program instructions include program instructions to move a first pointer from the first index in the array of the selected group to a second index in the array of the selected group, based at least in part on the number of requested logical disk extents. The program instructions include program instructions to release the lock on the selected group to allow allocating a logical disk extent other than in response to the allocation request.

DETAILED DESCRIPTION

Figure 1:
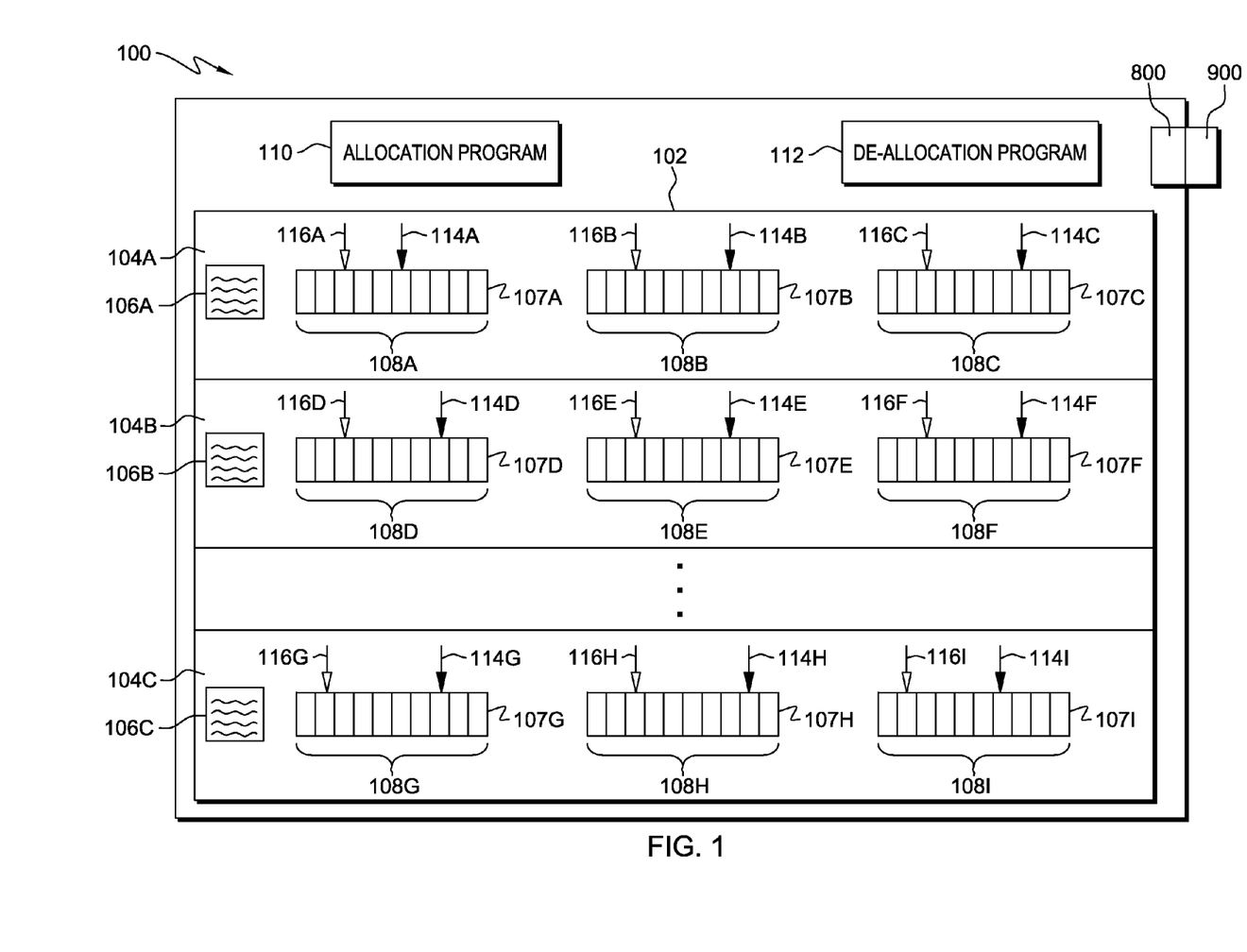
FIG. 1 illustrates a computer system for allocating and de-allocating logical disk extents, according to one embodiment of the present invention.

The present invention will now be described with reference to the figures. FIG. 1 illustrates a computer system 100 for allocating and de-allocating logical disk extents, according to one embodiment of the present invention. Computer system 100 has a logical disk space 102. Logical disk space 102 is built on, and spans, one or more physical random access disk drives. Logical disk space 102 is a representation of available space in the underlying one or more physical random access disk drives. Logical disk space 102 is divided into logical disk segments 104A, 104B, and 104C. Maps 106A-C track logical disk extent allocations within logical disk segments 104A-C, respectively. Although the example embodiment illustrates three logical disk segments 104A-C, it should be understood that a logical disk space may include any number of logical disk segments.

Logical disk segment 104A is divided into one or more allocation groups 107A-C, logical disk segment 104B is divided into one or more allocation groups 107D-F, and logical disk segment 104C is divided into one or more allocation groups 107G-I. Maps 106A-C therefore represent an array of allocation groups. When a new physical disk is added to logical disk space 102 of computer 100, the new disk space is divided up into allocation groups. The new allocation groups may be added to the last logical disk segment 104C, or the new allocation groups may be added to a new logical disk segment. Maintaining multiple allocation groups 107A-I enables computer 100 to service multiple requests for block allocation in a parallel manner.

Allocation groups 107A-I include an array of fixed size logical disk extents 108A-I, respectively. A logical disk extent is the basic unit of allocation as defined in maps 106A-C. A logical disk extent is separate from an input/output (I/O) block, which is used to interact with a kernel's memory manager, such as the virtual memory manager of the kernel of the IBM® AIX® operating system. A logical disk extent is also separate from a physical disk block, which is the basic unit of I/O underlying the logical disk space 102. Maintaining separate block sizes for different layers allows for flexibility in configuring I/O at both the kernel layer and at the physical disk layer.

Each allocation group 107A-I has a respective allocation pointer 114A-I for pointing to the next logical disk extent available for allocation when servicing an allocation request. Each allocation group 107A-I has an allocation lock for locking an allocation group. Setting the allocation lock prevents a logical disk extent from being allocated twice in response to two separate and simultaneous allocation requests that are each from two separate threads. Each allocation group 107A-I has a respective de-allocation pointer 116A-I for pointing to the next logical disk extent available for de-allocation when an allocated logical disk extent is no longer required and is being released. Each allocation group 107A-I has a de-allocation lock for locking an allocation group. Setting the de-allocation lock prevents the allocation group from receiving a second de-allocation request on a second thread while a first de-allocation request from a first thread is being processed.

Computer 100 has an allocation program 110 for allocating logical disk extents as requested by threads, programs, or other services. Computer 100 has a de-allocation program 112 for de-allocating logical disk extents that are no longer needed by a requesting thread, program, or service. In an example embodiment, allocation program 110 and de-allocation program 112 constitute a file system of an operating system. As will be described in more detail with respect to the flow charts of FIGS. 2 and 3, allocation program 110 and de-allocation program 112 allocate logical disk extents and release logical disk extents, respectively, in a round-robin manner. Thus, the overhead of rearranging logical disk extents, or disk blocks, in order to maintain contiguity thereof, is eliminated. However, because logical disk space 102 is built on one or more random access physical disk drives, the time required to allocate and release logical disk extents remains relatively constant over time even though the logical disk extents may become non-contiguous over time.

Figure 2:
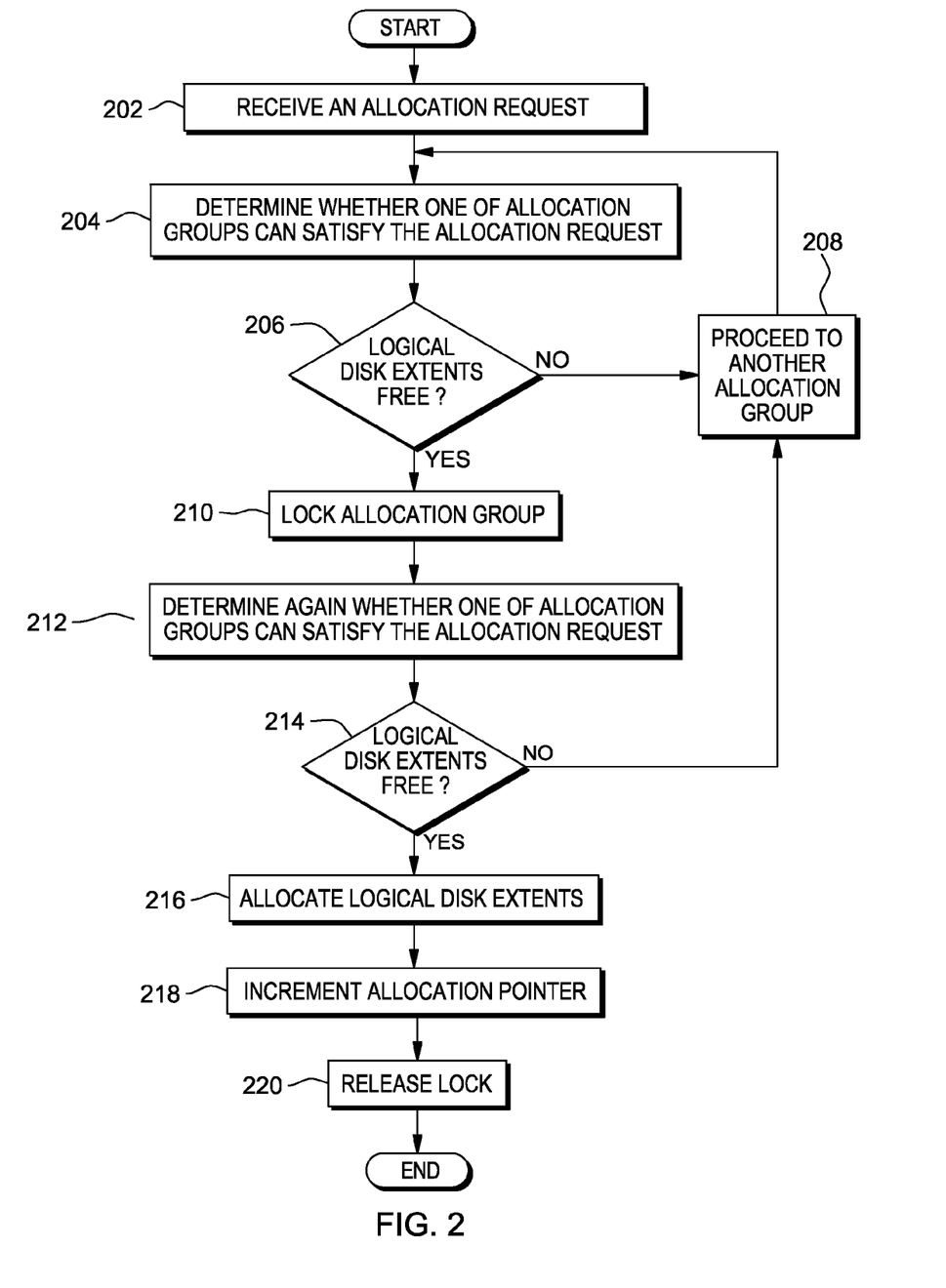
FIG. 2 is a flow chart of an allocation program of FIG. 1 for allocating logical disk extents, according to one embodiment of the present invention.

FIG. 2 is a flow chart of allocation program 110 of FIG. 1 for allocating logical disk extents, according to one embodiment of the present invention. At step 202, allocation program 110 receives an allocation request requesting a number of logical disk extents. At step 204, allocation program 110 determines whether one of allocation groups 107A-I can satisfy the allocation request, without first setting the allocation lock to lock the allocation group. Without setting the allocation lock before determining whether the allocation group can satisfy the allocation request, it is possible that application program 110 can allocate some or all of the number of free logical disk extents in response to a second allocation request. Consequently, a determination that the allocation group can satisfy the original allocation request may be inaccurate. However, determining whether the allocation group can satisfy the allocation request without first setting the allocation lock is advantageous in that it improves the performance of allocation program 110 and helps reduce queuing of allocation requests at an allocation group that would occur by setting the allocation lock.

Allocation program 110 determines whether the allocation group can satisfy the allocation request by calculating the free number of logical disk extents for the allocation group, e.g., allocation group 107A, in one of two ways, depending on whether an allocation pointer, e.g., allocation pointer 114A, is less than or greater than a de-allocation pointer, e.g., de-allocation pointer 116A. The allocation pointer and the de-allocation pointer are initially both set to 0, e.g., the first index in array of fixed size logical disk extents 108A, but are adjusted by allocation program 110 and de-allocation program 112, as will be described. Since allocation program 110 performs logical disk extent allocation in a round-robin manner, and since the array of fixed size logical disk extents is fixed in size, the allocation pointer will, at some point, reach the end of the array and then return to the beginning of the array as the logical disk extents at the end of the allocation group become allocated and the logical disk extents at the beginning of the array are released. Thus, if the allocation pointer is greater then or equal to the de-allocation pointer, allocation program 110 calculates the number of free logical disk extents by adding the size of the array (AS) to de-allocation pointer (DP) and then subtracting from that total allocation pointer (AP).

Of Free Logical Disk Extents=DP+AS−AP

If allocation pointer is less then de-allocation pointer, allocation program 110 calculates the number of free logical disk extents by subtracting allocation pointer (AP) from de-allocation pointer (DP).

Of Free Logical Disk Extents=DP−AP

At step 206, allocation program 110 compares the number of logical disk extents requested in the allocation request to the calculated number of free logical disk extents. If allocation program 110 determines that the number of logical disk extents requested in the allocation request is greater than the number of free logical disk extents (decision 206, no branch), then allocation program 110 proceeds to another allocation group, e.g., allocation group 107B, at step 208, and repeats step 204. In an example embodiment, if allocation program 110 determines that none of the allocation groups have available the number of logical disk extents requested in the allocation request, allocation program 110 breaks down the allocation request into a number of smaller requests. For example, if 8 logical disk extents are requested in the allocation request and two different allocation groups each have 4 free logical disk extents, allocation program 110 may divide the request for 8 logical disk extents into two requests of 4 logical disk extents, respectively.

If allocation program 110 determines that the number of logical disk extents requested in the allocation request is less than or equal to the number of free logical disk extents (decision 206, yes branch), then allocation program 110 sets the allocation lock to lock the allocation group at step 210, thereby preventing free logical disk extents of the allocation group from being allocated to a requester of a second allocation request. In one example, at step 210, allocation program 110 may set the allocation lock of a first allocation group to lock the first allocation group, and then allocate logical disk extents from a second allocation group to a second thread in response to receiving a second allocation request from the second thread while the allocation lock is set. In another example, allocation program 110 may place the second allocation request in a queue until the allocation lock is released.

At step 212, allocation program 110 again determines whether the allocation group can satisfy the allocation request by calculating the number of free logical disk extents for the allocation group, using the same method described in step 204. Allocation program 110 performs the same determination a second time, as the allocation lock that locks the allocation group was not set when allocation program 110 performed the determination the first time at step 204. In between allocation program 100 performing the determination at step 204 and setting the allocation lock to lock the allocation group at step 210, logical disk extents determined to have been initially free at step 204 may have been allocated in response to a second allocation request. Thus, allocation program 110 performs a second check at step 212.

If allocation program 110 determines that the number of logical disk extents requested in the allocation request is now greater than the number of free logical disk extents (decision 214, no branch), then allocation program 110 proceeds to another allocation group, at step 208, and repeats step 204.

If allocation program 110 determines that the number of logical disk extents requested in the allocation request is still less than or equal to the number of free logical disk extents (decision 214, yes branch), then allocation program 110 allocates the number of logical disk extents requested in the allocation request, at step 216, to service the allocation request. Allocation program 110 allocates a logical disk extent by removing the logical disk extent from a slot in an array of logical disk extents, e.g., array 108A, of the allocation group, e.g., allocation group 107A, pointed to by the allocation pointer, e.g., allocation pointer 114A, and updating a corresponding map, e.g., map 106A.

At step 218, allocation program 110 increments the allocation pointer (AP) according to the number of logical disk extents (LDE) allocated in step 216, not to exceed the array size (AS).

AP=(AP+LDE)Modulo AS

Since the array is a fixed size, the allocation pointer resets to 0, e.g., the first index in the array, after reaching the last index in the array, before being further incremented. For example, allocation program 110 increments allocation pointer 114A currently pointing to logical disk extent #7 in allocation group 107A including 10 logical disk extents to point to logical disk extent #2 after allocation program 110 allocates 5 logical disk extents to service a request. At step 220, allocation program 110 releases the allocation lock.

Figure 3:
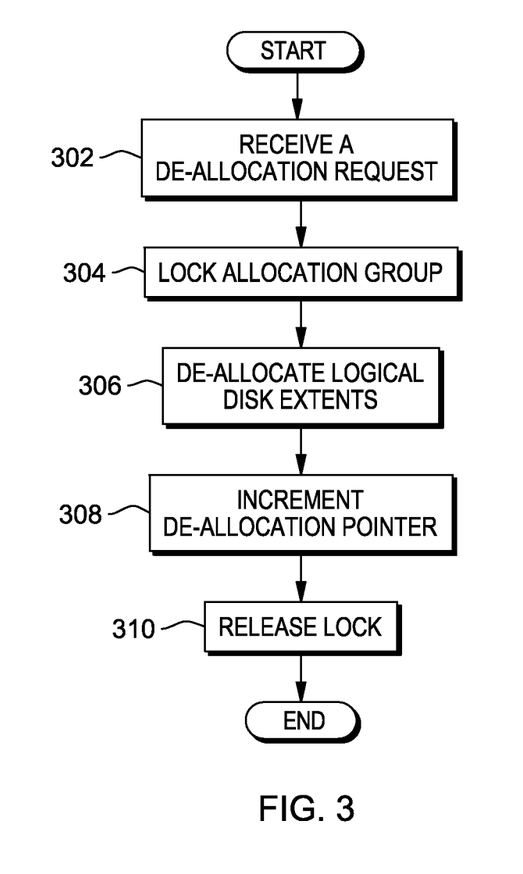
FIG. 3 is a flow chart of a de-allocation program of FIG. 1 for de-allocating logical disk extents, according to one embodiment of the present invention.

FIG. 3 is a flow chart of a de-allocation program 112 of FIG. 1 for de-allocating logical disk extents, according to one embodiment of the present invention. At step 302, de-allocation program 112 receives a request to de-allocate a number of currently allocated logical disk extents.

At step 304, de-allocation program 112 sets a de-allocation lock, e.g., de-allocation lock 116A, to lock an allocation group, e.g., allocation group 107A, thereby preventing the allocation group from receiving a second de-allocation request while a first de-allocation request is being processed. De-allocation program 112 de-allocates a logical disk extent to the same allocation group from which the logical disk extent was originally allocated. An address of a logical disk extent is indicative of a corresponding allocation group. Therefore, de-allocation program 112 sets a de-allocation lock to lock an allocation group, based on an address of a logical disk extent to be de-allocated. It should be understood that the de-allocation lock does not prevent allocation program 110 from allocating logical disk extents. In other words, allocation program 110 and de-allocation program 112 may have locks on the allocation group simultaneously and may perform allocate and de-allocate procedures, respectively, in parallel.

At step 306, de-allocation program 112 de-allocates the number of logical disk extents requested to be de-allocated. De-allocation program 112 de-allocates a logical disk extent by inserting the logical disk extent back into the array of disk extents, e.g., array 108A, in the allocation group into a slot pointed to by de-allocation pointer 116 and updating a corresponding map, e.g., map 106A.

At step 308, de-allocation program 112 increments de-allocation pointer (DP), e.g., de-allocation pointer 116A, by the number of logical disk extents (LDE) that were de-allocated in step 306, not to exceed the array size (AS).

$$DP = (DP + LDE) \text{ Modulo } AS$$

At step 310, de-allocation program 112 releases the de-allocation lock on the allocation group.

Figure 4:
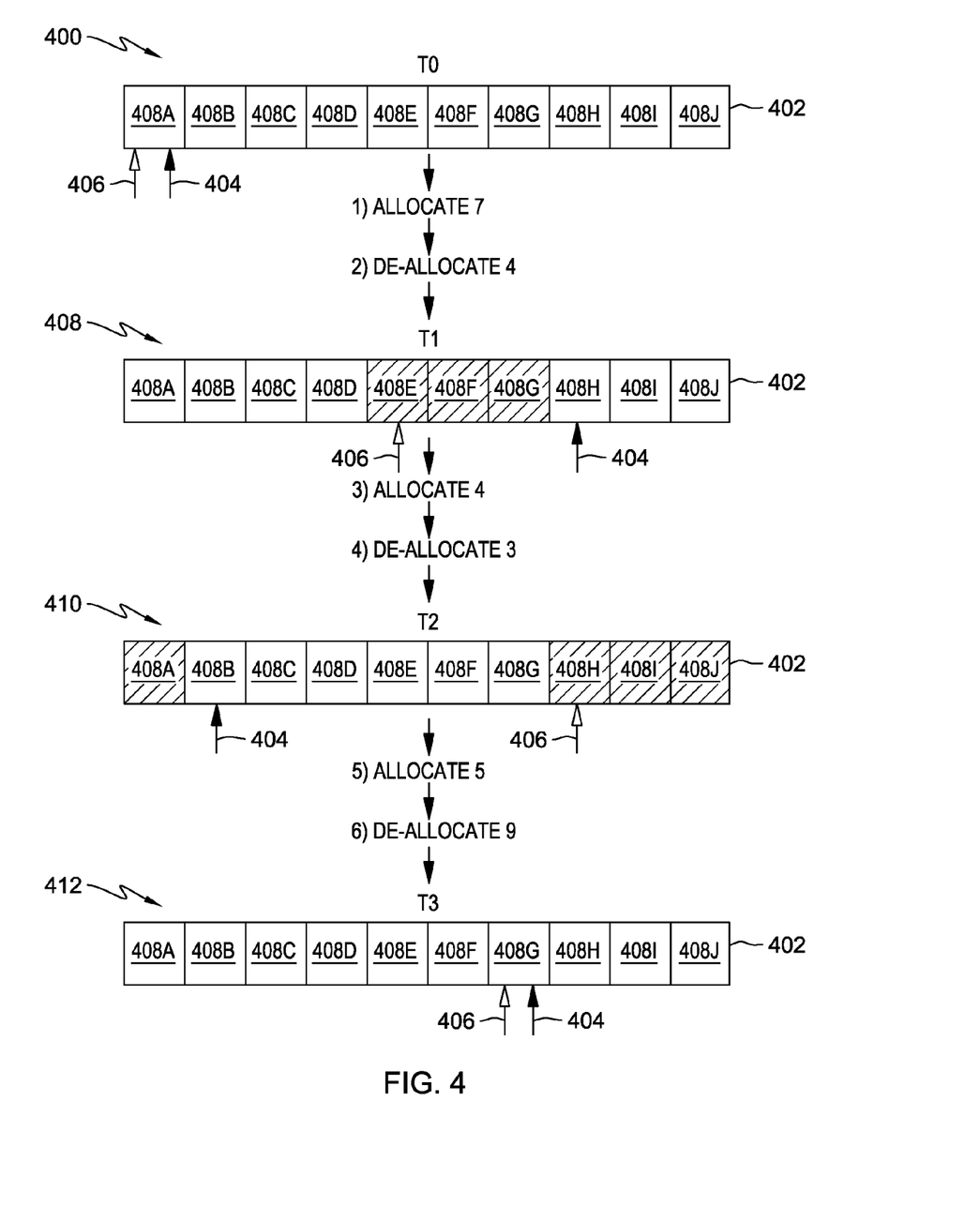
FIG. 4 is a state diagram for an allocation group, according to one embodiment of the present invention.

FIG. 4 illustrates a state diagram for an allocation group 402, according to one embodiment of the present invention. At Time T0 400, allocation pointer 404 and de-allocation pointer 406 are both initialized to point to logical disk extent 408A and all logical disk extents 408A-J are available for allocation.

At time T1 408, after allocation program 110 has allocated 7 logical disk extents, and after de-allocation program 112 has de-allocated 4 logical disk extents, allocation group 402 has 7 logical disk extents available for allocation. Specifically, allocation pointer 404 is pointing to logical disk extent 408H, and de-allocation pointer 406 is pointing to logical disk extent 408E. Thus, logical disk extents 408E-G are allocated, and logical disk extents 408A-D and logical disk extents 408H-J are available for allocation.

At time T2 410, after allocation program 110 has allocated 4 logical disk extents, and after de-allocation program 112 has de-allocated 3 logical disk extents, allocation group 402 has 6 logical disk extents available for allocation. Specifically, allocation pointer 404 is pointing to logical disk extent 408B, and de-allocation pointer 406 is pointing to logical disk extent 408H. Thus, logical disk extents 408A and 408H-J are allocated, while logical disk extents 408B-408G are available for allocation.

At time T3 412, after allocation program 110 has allocated 5 logical disk extents, and after de-allocation program 112 has de-allocated 9 logical disk extents, allocation pointer 404 and de-allocation pointer 406 are both pointing to logical disk extent 408G. Thus, all 10 logical disk extents 408A-J of allocation program 402 are again available for allocation.

Figure 5:
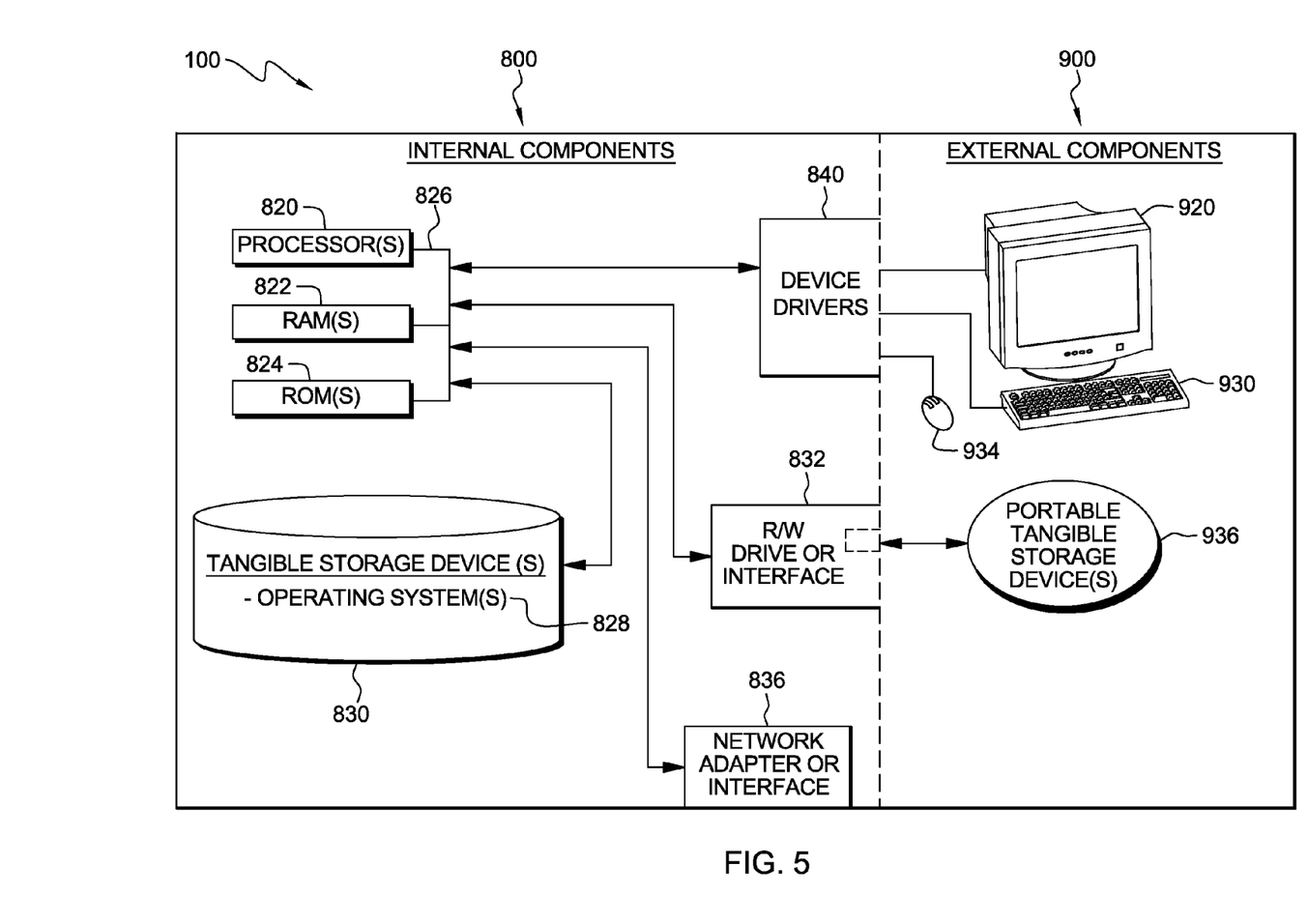
FIG. 5 illustrates hardware and software components of the computer system of FIG. 1.

FIG. 5 illustrates hardware and software components of computer system 100 of FIG. 1. Computer system 100 includes internal components 800 and external components 900. Internal components 800 include one or more processors 820, one or more computer-readable RAMs 822 and one or more computer-readable ROMs 824 on one or more buses 826, and one or more guest operating systems 828 and one or more computer-readable tangible storage devices 830. The one or more operating systems 828, allocation program 110, and de-allocation program 112 are stored on at least one or more of the computer-readable tangible storage devices 830 for execution by at least one or more of the processors 820 via at least one or more of the RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information. As used herein, a computer-readable tangible storage device is not to be construed as being a transitory signal per se, such as radio waves or other freely propagating electromagnetic waves, electromagnetic waves propagating through a waveguide or other transmission media (e.g., light pulses passing through a fiber-optic cable), or electrical signals transmitted through a wire.

Internal components 800 also include a R/W drive or interface 832 to read from and write to one or more portable computer-readable tangible storage devices 936 such as a CD-ROM, DVD, memory stick, magnetic tape, magnetic disk, optical disk or semiconductor storage device. Allocation program 110 and De-allocation program 112 can be stored on at least one or more of the portable computer-readable tangible storage devices 936, read via R/W drive or interface 832 and loaded into at least one of one or more computer-readable tangible storage devices 830.

Internal components 800 also include a network adapter or interface 836 such as a TCP/IP adapter card. Allocation program 110 and De-allocation program 112 can be downloaded to computer system 100 from an external computer via a network (for example, the Internet, a local area network or other, wide area network) and network adapter or interface 836. From the network adapter or interface 836, allocation program 110 and de-allocation program 112 are loaded into at least one of one or more computer-readable tangible storage devices 830. The network may comprise copper wires, optical fibers, wireless transmission, routers, firewalls, switches, gateway computers and/or edge servers.

External components 900 include a computer display monitor 920, a keyboard 930, and a computer mouse 934. Internal components 800 also include device drivers 840 to interface to computer display monitor 920, keyboard 930 and computer mouse 934. The device drivers 840, R/W drive or interface 832 and network adapter or interface 836 comprise hardware and software (stored in one or more computer-readable tangible storage devices 830 and/or one or more computer-readable ROMs 824).

Allocation program 110 and de-allocation program 112 can be written in various programming languages including low-level, high-level, object-oriented or non object-oriented languages. Alternatively, the functions of allocation program 110 and de-allocation program 112 can be implemented in whole or in part by computer circuits and other hardware (not shown).

The description above has been presented for illustration purposes only. It is not intended to be an exhaustive description of the possible embodiments. One of ordinary skill in the art will understand that other combinations and embodiments are possible.

What is claimed is:

1. A method for allocating space on a logical disk, the method comprising the steps of:
   a computer receiving an allocation request to allocate a number of requested logical disk extents;
   the computer selecting one of a first group comprising an array of logical disk extents and a second group comprising an array of logical disk extents, the selected group having a number of free logical disk extents that is greater than or equal to the number of requested logical disk extents, the logical disk extents in the array of the first group and in the array of the second group corresponding to disk blocks on a logical disk, the logical disk spanning one or more physical random access disks;
   the computer locking the selected group to prevent allocating a logical disk extent other than in response to the allocation request;
   the computer allocating the number of requested logical disk extents in the selected group, starting at a first index in the array of the selected group;
   the computer moving a first pointer from the first index in the array of the selected group to a second index in the array of the selected group based at least in part on the number of requested logical disk extents;
   the computer releasing the lock on the selected group to allow allocating a logical disk extent other than in response to the allocation request; and the computer calculating the number of free logical disk extents, wherein: (a) if the second index, corresponding to the first pointer, in the array of the selected group is greater than or equal to a third index corresponding to a second pointer indicative of a starting index for de-allocation of logical disk extents in the array of the selected group, the calculated number of free logical disk extents is equal to the sum of the third index in the array of the selected group and a size of the array in the selected group, minus the second index in the array of the selected group, and (b) if the second index in the array of the selected group is less than the third index in the array of the selected group, the calculated number of free logical disk extents is equal to the third index in the array of the selected group minus the second index in the array of the selected group.

2. The method of claim 1, further comprising the steps of:
after the step of the computer locking the selected group and before the step of the computer releasing the lock on the selected group, the computer receiving a second allocation request to allocate a second number of requested logical disk extents;
the computer identifying that the selected group is locked and selecting another one of the first and second groups that is not locked, the selected other group having a number of free logical disk extents greater than or equal to the second number of requested logical disk extents;
the computer locking the selected other group to prevent allocating a logical disk extent other than in response to the second allocation request;
the computer allocating the second number of requested logical disk extents in the selected other group, starting at a first index in the array of the selected other group;
the computer moving a second pointer from the first index in the array of the selected other group to a second index in the array of the selected other group based at least in part on the second number of requested logical disk extents; and
the computer releasing the lock on the selected other group to allow allocating a logical disk extent other than in response to the second allocation request.

3. The method of claim 1, further comprising the steps of:
the computer receiving a de-allocation request to de-allocate a number of allocated logical disk extents of the selected group;
the computer locking the selected group to prevent de-allocating a logical disk extent other than in response to the de-allocation request;
the computer de-allocating the number of allocated logical disks extents in the selected group, starting at an index in the array of the selected group corresponding to a second pointer;
the computer moving the second pointer from the index corresponding to the second pointer to the another index in the array of the selected group based at least in part on the number of allocated logical disk extents to de-allocate; and
the computer unlocking the selected group to allow de-allocating a logical disk extent other than in response to the de-allocation request.

4. The method of claim 1, further comprising the step of:
before the selecting step, the computer determining whether one of the first group and the second group has a sufficient number of free logical disk extents to satisfy the received allocation request, while free logical disk extents in the array of the first group and the array of the second group are available for allocation in response to a second allocation request.

5. The method of claim 1, further comprising the step of:
after the locking step, and before the allocating step, the computer re-determining whether the one of the first group and the second group has a sufficient number of free logical disk extents to satisfy the received allocation request.

6. The method of claim 1, further comprising the steps of:
the computer receiving a de-allocation request to de-allocate a number of allocated logical disk extents of the selected group; and
subsequent to the step of locking the selected group to prevent allocating a logical disk extent other than in response to the allocation request, and prior to releasing the lock, the computer de-allocating the number of allocated logical disk extents requested for de-allocation.

7. A computer program product for allocating space on a logical disk, the computer program product comprising:
one or more computer readable tangible storage devices;
program instructions stored on the one or more computer readable tangible storage devices, the program instructions comprising:
program instructions to receive an allocation request to allocate a number of requested logical disk extents;
program instructions to select one of a first group comprising an array of logical disk extents and a second group comprising an array of logical disk extents, the selected group having a number of free logical disk extents that is greater than or equal to the number of requested logical disk extents, the logical disk extents in the array of the first group and in the array of the second group corresponding to disk blocks on a logical disk, the logical disk spanning one or more physical random access disks;
program instructions to lock the selected group to prevent allocating a logical disk extent other than in response to the allocation request;
program instructions to allocate the number of requested logical disk extents in the selected group, starting at a first index in the array of the selected group;
program instructions to move a first pointer from the first index in the array of the selected group to a second index in the array of the selected group based at least in part on the number of requested logical disk extents;
program instructions to release the lock on the selected group to allow allocating a logical disk extent other than in response to the allocation request; and
the computer calculating the number of free logical disk extents, wherein: (a) if the second index, corresponding to the first pointer, in the array of the selected group is greater than or equal to a third index corresponding to a second pointer indicative of a starting index for de-allocation of logical disk extents in the array of the selected group, the calculated number of free logical disk extents is equal to the sum of the third index in the array of the selected group and a size of the array in the selected group, minus the second index in the array of the selected group, and (b) if the second index in the array of the selected group is less than the third index in the array of the selected group, the calculated number of free logical disk extents is equal to the third index in the array of the selected group minus the second index in the array of the selected group.

8. The computer program product of claim 7, further comprising program instruction, stored on the one or more computer readable tangible storage devices, to:

receive a second allocation request to allocate a second number of requested logical disk extents;

identify that the selected group is locked and select another one of the first and second groups that is not locked, the selected other group having a number of free logical disk extents greater than or equal to the second number of requested logical disk extents;

lock the selected other group to prevent allocating a logical disk extent other than in response to the second allocation request;

allocate the second number of requested logical disk extents in the selected other group, starting at a first index in the array of the selected other group;

move a second pointer from the first index in the array of the selected other group to a second index in the array of the selected other group based at least in part on the second number of requested logical disk extents; and release the lock on the selected other group to allow allocating a logical disk extent other than in response to the second allocation request.

9. The computer program product of claim 7, further comprising program instructions, stored on the one or more computer readable tangible storage devices, to:

receive a de-allocation request to de-allocate a number of allocated logical disk extents of the selected group;

lock the selected group to prevent de-allocating a logical disk extent other than in response to the de-allocation request;

de-allocate the number of allocated logical disks extents in the selected group, starting at an index in the array of the selected group corresponding to a second pointer;

move the second pointer from the index corresponding to the second pointer to the another index in the array of the selected group based at least in part on the number of allocated logical disk extents to de-allocate; and unlock the selected group to allow de-allocating a logical disk extent other than in response to the de-allocation request.

10. The computer program product of claim 7, further comprising program instructions, stored on the one or more computer readable tangible storage devices, to:

before selecting one of the first and second groups, determine whether one of the first group and the second group has a sufficient number of free logical disk extents to satisfy the received allocation request, while free logical disk extents in the array of the first group and the array of the second group are available for allocation in response to a second allocation request.

11. The computer program product of claim 10, further comprising program instructions, stored on the one or more computer readable tangible storage devices, to:

after locking the selected group, and before allocating the number of requested logical disk extents in the selected group, re-determine whether the one of the first group and the second group has a sufficient number of free logical disk extents to satisfy the received allocation request.

12. The computer program product of claim 7, further comprising program instructions, stored on the one or more computer readable tangible storage devices, to:

receive a de-allocation request to de-allocate a number of allocated logical disk extents of the selected group; and subsequent to locking the selected group to prevent allocating a logical disk extent other than in response to the allocation request, and prior to releasing the lock, de-allocate the number of allocated logical disk extents requested for de-allocation.

13. A computer system for allocating space on a logical disk, the computer system comprising:

one or more computer processors;

one or more computer readable tangible storage devices; and program instructions stored on at least one of the one or more computer tangible storage devices for execution by at least one of the one or more processors, the program instructions comprising:

program instructions to receive an allocation request to allocate a number of requested logical disk extents;

program instructions to select one of a first group comprising an array of logical disk extents and a second group comprising an array of logical disk extents, the selected group having a number of free logical disk extents that is greater than or equal to the number of requested logical disk extents, the logical disk extents in the array of the first group and in the array of the second group corresponding to disk blocks on a logical disk, the logical disk spanning one or more physical random access disks;

program instructions to lock the selected group to prevent allocating a logical disk extent other than in response to the allocation request;

program instructions to allocate the number of requested logical disk extents in the selected group, starting at a first index in the array of the selected group;

program instructions to move a first pointer from the first index in the array of the selected group to a second index in the array of the selected group based at least in part on the number of requested logical disk extents;

program instructions to release the lock on the selected group to allow allocating a logical disk extent other than in response to the allocation request; and the computer calculating the number of free logical disk extents, wherein: (a) if the second index, corresponding to the first pointer, in the array of the selected group is greater than or equal to a third index corresponding to a second pointer indicative of a starting index for de-allocation of logical disk extents in the array of the selected group, the calculated number of free logical disk extents is equal to the sum of the third index in the array of the selected group and a size of the array in the selected group, minus the second index in the array of the selected group, and (b) if the second index in the array of the selected group is less than the third index in the array of the selected group, the calculated number of free logical disk extents is equal to the third index in the array of the selected group minus the second index in the array of the selected group.

14. The computer system of claim 13, further comprising program instruction, stored on at least one of the one or more computer readable tangible storage devices for execution by at least one of the one or more computer processors, to:

receive a second allocation request to allocate a second number of requested logical disk extents;

identify that the selected group is locked and select another one of the first and second groups that is not locked, the selected other group having a number of free logical disk extents greater than or equal to the second number of requested logical disk extents;

lock the selected other group to prevent allocating a logical disk extent other than in response to the second allocation request;

allocate the second number of requested logical disk extents in the selected other group, starting at a first index in the array of the selected other group;

move a second pointer from the first index in the array of the selected other group to a second index in the array of the selected other group based at least in part on the second number of requested logical disk extents; and release the lock on the selected other group to allow allocating a logical disk extent other than in response to the second allocation request.

15. The computer system of claim 13, further comprising program instructions, stored on at least one of the one or more computer readable tangible storage devices for execution by at least one of the one or more computer processors, to:

receive a de-allocation request to de-allocate a number of allocated logical disk extents of the selected group;

lock the selected group to prevent de-allocating a logical disk extent other than in response to the de-allocation request;

de-allocate the number of allocated logical disks extents in the selected group, starting at an index in the array of the selected group corresponding to a second pointer;

move the second pointer from the index corresponding to the second pointer to the another index in the array of the selected group based at least in part on the number of allocated logical disk extents to de-allocate; and unlock the selected group to allow de-allocating a logical disk extent other than in response to the de-allocation request.

16. The computer system of claim 13, further comprising program instructions, stored on at least one of the one or more computer readable tangible storage devices for execution by at least one of the one or more computer processors, to:

before selecting one of the first and second groups, determine whether one of the first group and the second group has a sufficient number of free logical disk extents to satisfy the received allocation request, while free logical disk extents in the array of the first group and the array of the second group are available for allocation in response to a second allocation request.

17. The computer system of claim 16, further comprising program instructions, stored on at least one of the one or more computer readable tangible storage devices for execution by at least one of the one or more computer processors, to:

after locking the selected group, and before allocating the number of requested logical disk extents in the selected group, re-determine whether the one of the first group and the second group has a sufficient number of free logical disk extents to satisfy the received allocation request.

* * * * *